United States Patent [19]

Volk

[11] Patent Number: 4,615,075
[45] Date of Patent: Oct. 7, 1986

[54] POULTRY LEG RETAINER

[76] Inventor: Anthony J. Volk, P.O. Box 943, Turlock, Calif. 95380

[21] Appl. No.: 731,881

[22] Filed: May 8, 1985

[51] Int. Cl.[4] .............................................. A22C 21/00
[52] U.S. Cl. .......................................... 17/1 S; 17/11
[58] Field of Search ..................................... 17/1 S, 11

[56] References Cited

U.S. PATENT DOCUMENTS 3,895,415 7/1975 Volk .................................. 17/1 S X
4,051,573 10/1977 Volk .................................. 17/1 S X
4,056,865 11/1977 Cloyd .................................... 17/1 S Primary Examiner—Willie G. Abercrombie
Attorney, Agent, or Firm—Alvin E. Hendricson

[57] ABSTRACT

The present invention provides an integral retainer for trussing the legs of eviscerated poultry including an upper bridle portion of resiliently deflectable strips adapted to fit about and across the hocks of poultry legs and connected by resiliently extensible legs to a rigid beam member having upturned pointed ends adapted for insertion in kidney holes in the backbone structure of poultry to anchor the retainer.

7 Claims, 8 Drawing Figures

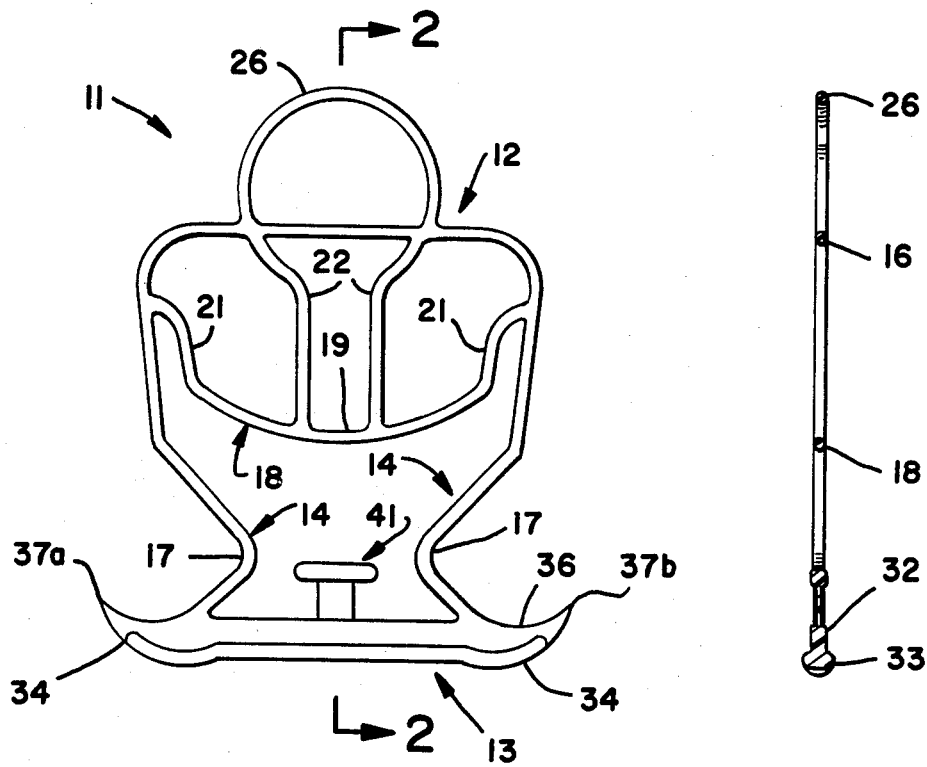
FIG_1
FIG_2
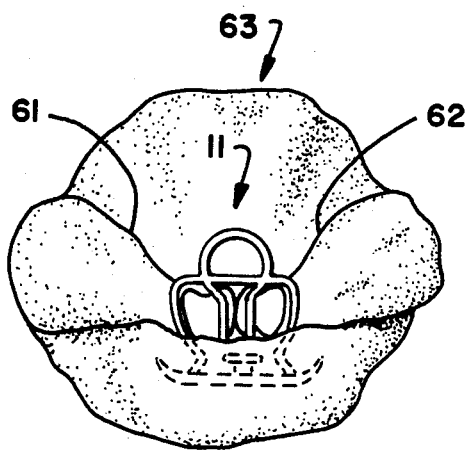
FIG_3

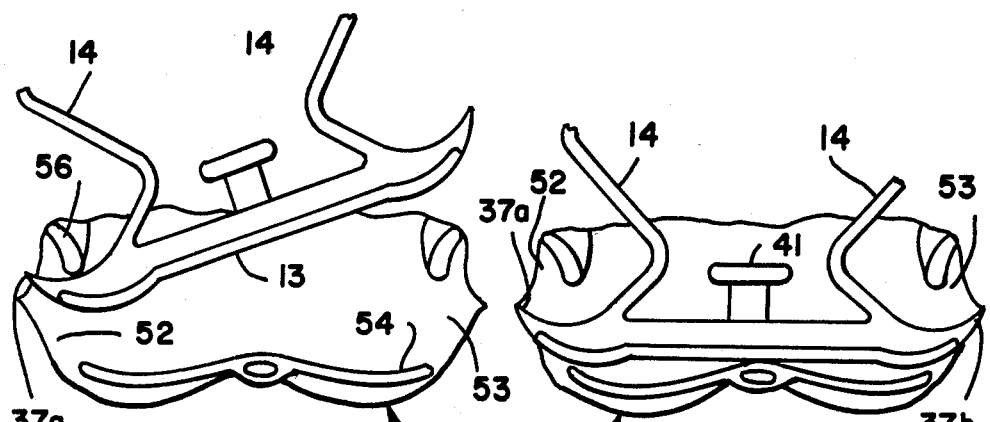
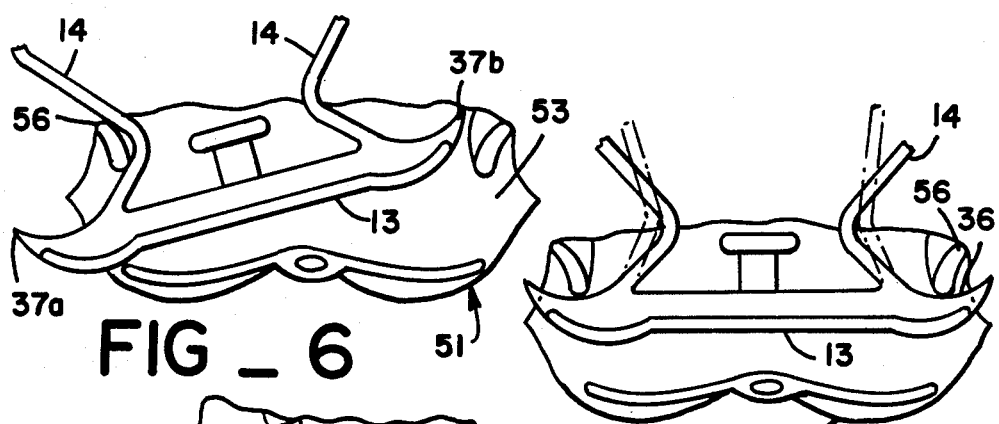
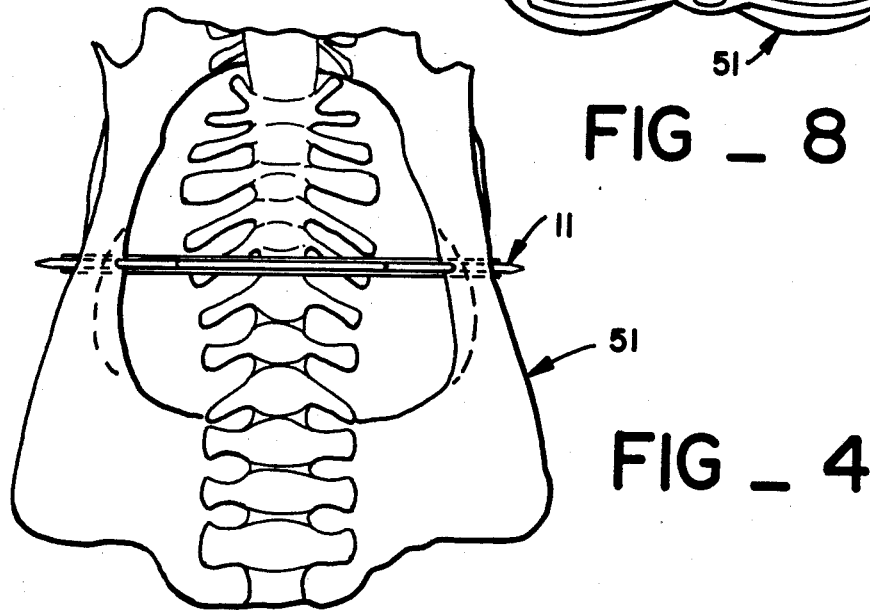

POULTRY LEG RETAINER

The present invention provides a retainer for trussing the legs of poultry and formed of a limitedly resilient wholly inert material such as nylon.

BACKGROUND OF INVENTION

There have been developed a variety of different trussing methods and devices for retaining the legs of eviscerated poultry such as turkeys tightly against the body and in closing relation to the rear body opening. One manner of preparing poultry for sale termed "bar cutting" provides a strip of skin across the rear body opening so that the legs may be tucked thereunder, however, this is often difficult to accomplish. The most successful device marked to date has been that sold under the trademark of HOK-LOK and disclosed in U.S. Pat. No. 3,112,515. This metal retainer has received widespread acceptance and subsequent devices of the same general nature have been formed of nylon and the like, as shown in U.S. Pat. Nos. 3,895,415 and 4,051,573 and reference is made to the patents cited therein for an identification of the state of the art.

SUMMARY OF INVENTION

The present invention is basically comprised of an integral upper bridle of thin nylon straps connected to a lower reinforced beam or brace by thin extensible legs. The upper bridle portion is adapted to be resiliently deflected over the hocks of a turkey, for example, that has had the lower legs removed. The lower beam is formed to be substantially inflexible with up turned outer ends adapted to be fitted into the kidney holes of the turkey for firm anchoring of the retainer.

The legs of the retainer which connect the upper bridle and lower beam are also formed of thin nylon straps or the like which have a substantial bend therein toward each other above the beams. These legs are thus longitudinally extensible by resilient straightening of the bends therein. In this manner the retainer hereof is adapted to engage and retain the legs of all poultry of substantially different weights.

The poultry retainer is hereof provided as a single intergral unit formed of nylon which may be readily injection molded. The retainer is also formed of a minimum amount of material for minimizing the cost of the unit.

BRIEF DESCRIPTION OF DRAWINGS

The present invention is illustrated with respect to a preferred embodiment thereof in the accompanying drawing wherein:

FIG. 1 is a plan view of a poultry retainer in accordance with the present invention.

FIG. 2 is a central sectional view taken in the plane of 2—2 of FIG. 1;

FIG. 3 is an end view of a turkey with the retainer of the present invention in place;

FIG. 4 is a partial plan view of a turkey backbone structure with the retainer of FIG. 1 engaged therewith; and FIGS. 5 through 8 are diagiamatic illustrations of steps in inserting the retainer in a turkey backbone structure.

DESCRIPTION OF PREFERRED EMBODIMENT

The present invention provides an improved trussing device for holding the legs of eviscerated poultry such as turkeys which are herein taken as an example of an application of the present invention. This invention is formed as a single intergal unit of nylon which may be readily formed by using standard plastic injection molding machine.

The trussing device hereof is generally comprised of an upper bridle or the like 12 adapted to be engaged with the hocks of a turkey or the like and connected by extensible legs or strips 14 to a lower rigid beam 13 having pointed upturned ends adapted to be fitted into the kidney holes of the backbone of a turkey. Referring now to FIGS. 1 and 2 there will be seen to be shown a trussing device 11, generally comprised as a upper bridle portion 12 and bottom beam member 13 connected by legs or strips 14. The upper bridle portion is generally similar to the upper portion of my invention of U.S. Pat. No. 3,895,415. This portion of the present invention includes an upper cross piece 16 having down turned ends merging into depending legs 14 including inwardly V-shaped portion 17 merging into the lower beam 13 adjacent the outer ends thereof. This bridle portion 12 also includes a lower strip or member 18 which is shown to include a central curved portion having the ends thereof inclined upwardly and upturned curved ends 21 merging into the downturned ends of the upper element 16 at the top of the legs 14. The bridle 12 also includes a pair of generally upright strips 22 connecting the upper and lower member 16 and 18 with the strip being being curved outwardly adjacent the upper member 16. These strips 22 are adapted to fit into the creases of the hocks of turkey or the like and there is also provided an upper semiannular loop element 26 extending upwardly from the upper member 16 at the joinder of the strips 22 and such upper member. The upper portions of the strips 22 may be curved to form an extension of the curvature of the loop 26. The loop element 26 is provided as a finger hold to grasp the device of the present invention during application or removal of same from a turkey.

The bridle 12 and legs 14 of the present invention are formed of thin strips of nylon which may be cylindrical in cross section, as illustrated in FIG. 2, and it will be appreciated that, as such, these elements are limitedly flexible. The thin strip of the bridle may be flexibly bent or deformed not only in the plane of the drawing of FIG. 1 but also perpendicularly thereto, ie. in the plan of FIG. 2. This provides the present invention with the capability of being readily attached to and in engagement with the hocks of a turkey, as a described below.

In distinction to the flexible nature of the bridle 12 and the legs 14 of the present invention there is provided a lower beam 13 which is substantially inflexible. This beam 13, as shown in FIGS. 1 and 2, is formed of a straight central portion 31 including a generally rectangular plate 32 with reinforcing ribs 33 along the front and back thereof at the bottom of plate. The ends of the plate 32 have curved under surfaces 34 that are shown to extend slightly below the straight plate edge and to curve upwardly to a point slightly above the top edge of the plate and outwardly of the same. The upper surface of the plate outwardly of the legs 14 is formed with a concave surface 36 curving upwardly to a point 37 at the conjunction thereof with the under curved surface 34 of the plate, as indicated in FIG. 1. These points 37a and 37b at opposite ends of the beams 31 may be disposed slightly above the top level of the plate.

There may be additionally provided an upstanding protruberance 41 on the upper side of the beam 13 between the legs 14. This protruberance 41 may be formed in a variety of configurations such as a T-shaped element, as shown, and is provided for the purpose of gripping the lower portion of the retainer by the fingers of one inserting same in a turkey carcass, as further described below.

Considering now the insertion or attachment of the present invention in an eviscerated turkey carcass, reference is made to FIGS. 4 through 8. In FIG. 4, there is schematically illustrated a portion of a backbone structure 51 of a turkey in plan view with the trussing device 11 of the present invention in place engaging same. It is noted that the backbone structure 51 includes a pair of kidney holes 52 and 53 opening laterally outward of the structure 51 above the backbone 54 and through bone structure 56 extending generally upwardly along the side of the backbone 54. It is particularly noted that these openings or kidney holes extend laterally through bone structure and the kidneys of poultry are disposed outwardly of these holes in communication with the interior of the carcass through the holes. The kidneys may be removed during eviseration of the turkey and in the illustrations of FIGS. 4 through 8 the kidneys are not shown.

The present invention is particularly constructed to take advantage of the backbone structure of a turkey or the like and referring particularly to FIG. 5, which is a partial section in the plane of in the retainer of FIG. 4, it will be seen that the retainer is titled and one point 37a of the beam 13 is inserted in the kidney holes 52 of the back structure 51. It will be appreciated that access to the backbone structure or the like is achieved through the rear body opening after the turkey as been eviscerated. Following insertion of a point of the beam in a kidney opening 52, the retainer is then moved substantially as far as possible toward that kidney opening into the position generally indicated in FIG. 6 wherein one entire end of the beam 13 extends through such opening 52. It will appreciated that the V-shaped portion 17 of the retainer legs 14 allow for movement of the retainer sufficiently into the kidney hole that the other end of the beam 13 may then be pivoted downwardly past the bone structure 56 of the backbone so as to align the other end of the beam with the opposite kidney opening 53. The retainer is then moved to the right, as in FIG. 7, so the point 37b extends through the other kidney opening 53. In this position, as illustrated FIG. 7, the retainer is fully inserted and then may be raised by lifting same via the top finger hold 26 to pull the beam 13 up into engagement with the bone structure 56 at the top of the kidney holes 52 and 53. This is illustrated in FIG. 8 wherein it will be seen that the retainer is firmly engaged with the backbone structure 51 of the turkey. It is additionally illustrated in FIG. 8, that the distance between the beam 13 and the upper bridle 12 may be increased by pulling upwardly to lengthen out the legs 14 at the V-shaped portions thereof, as indicated in dashed lines in FIG. 8.

After insertion of the retainer hereof in the backbone structure of the turkey, the tail of the turkey is folded upwardly into the body opening and the legs 61 and 62 of the turkey 63 are drawn together against the body as illustrated in FIG. 3. The bridle 12 is then slipped over the hocks or leg knuckles at the ends of the turkey legs 61 or 62 with a strip 22 lying in the each of the creases of the hocks. Note that the curved configuration of the strips 22 allow extension of these strips and the lower member 19 may also be extended. The upper and lower member 16 and 18 is disposed behind the hocks and the bridle is pulled into this position by gripping the top loop 26, which may also be employed to extend the legs 14 by straightening the indented portions 17 to retain larger turkeys.

It will be seen that the present invention is quite easily inserted in engagement with the backbone structure of poultry and is firmly anchored therein by the lower beam 13 which is dimensioned to fit as illustrated. The legs are firmly held in trussed portions by the bridle and the retainer may be readily unloosed from the legs by lifting the loop 26 and swinging the bridle outwardly without disengaging the beam from the backbone structure. When the retainer is to be removed, after cooking of the poultry, for example, this may be readily accomplished by moving the beam to one side and tilting the retainer that it may be lifted from the carcass. Alternatively the retainer top may be cut away with scissors or knife.

Although the present invention has been described above with respect to a single preferred embodiment it will be appreciated by those skilled in the art that modifications and variations may be made within the spirit and scope of the invention and thus it is not intended to limit the invention by this precise terms of description or details of illustration.

What is claimed is:

1. An improved poultry retainer comprising
   a limitedly flexible bridle having a plurality of integral strips adapted to fit over and about the hocks of poultry, and
   a substantially rigid beam having upturned ends and dimensioned to fit into kidney holes of poultry with integral means interconnecting said bridle and beam,
   whereby said retainer is adapted to be anchored in an eviscerated poultry carcass and to engage the legs of such poultry to retain same tightly against the poultry body.

2. The retainer of claim 1 further defined by said means interconnecting said bridle and beam comprising a pair of strip legs depending from opposite lateral sides of said bridle and having bends toward each other between ends of the legs for resilient extension of the length of said legs.

3. The retainer of claim 1 further defined by said bridle, beam and interconnecting means being formed intergrally of nylon and said beam having at least one stiffening rib extending longitudinally thereof.

4. The retainer of claim 3 further defined by said beam having upwardly concave surfaces longitudinally of each end thereof with upturned pointed ends for engagement of poultry backbone structure through kidney openings therein.

5. An improved poultry retainer comprising
   a limitedly flexible bridle having a plurality of integral strips adapted to fit over and about the hocks of poultry, and
   comprising a longitudinal beam having a substantial depth to substantially prevent bending in one direction and ribs disposed on front and back of said beam to substantially prevent bending in another direction, said beam further having upstanding pointed ends and dimensioned for engaging backbone structure of poultry through kidney holes therein, said bridle, beam and interconnecting means being formed integrally of nylon, whereby said retainer is adapted to be anchored in an eviscerated poultry carcass and to engage the legs of such poultry to retain same tightly against the poultry body.

6. The retainer of claim 1 further defined by said bridle having spaced-apart upper and lower strips of nylon connected at the ends thereof by curved portions of the lower strip and curved intermediate integral strips extending between said upper and lower strips between the ends thereof, and an integral curved strip extending as a loop upwardly from said upper strip between the ends thereof as a finger grip.

7. The retainer of claim 6 further defined by said means interconnecting said bridle and beam comprising a pair of legs of thin nylon strips formed integral with said bridle and beam and extending between ends of said upper and lower bridle strips and said beam in spaced relation to the ends of said beam with said legs each having at least one curved portion directed toward each other whereby said legs are longitudinally flexibly extensible.

* * * * *